Jan. 18, 1966 W. G. FISHER ETAL 3,229,365

MACHINING

Filed Dec. 14, 1960 9 Sheets-Sheet 1

INVENTORS:
William G. Fisher
Carl F. Erikson
By Hofgren, Brady,
Wegner, Allen & Stellman,
Attys Jan. 18, 1966  W. G. FISHER ETAL  3,229,365

MACHINING

Filed Dec. 14, 1960  9 Sheets-Sheet 5

United States Patent Office 3,229,365
Patented Jan. 18, 1966

3,229,365
MACHINING
William G. Fisher and Carl F. Erikson, Belvidere, Ill.,
assignors to Sundstrand Corporation, a corporation of
Illinois
Filed Dec. 14, 1960, Ser. No. 75,737
3 Claims. (Cl. 29—559)

This invention relates to machining, and particularly to a method adapted for drastically reducing the number, the complexity, and the expense of work holding fixtures required for machining any part and especially for machining complex parts which conventionally require milling, boring, reaming, counter-boring and tapping operations normally necessitating the use of several or a large number of expensive precision fixtures for many different setups, the expensive time of highly skilled mechanics, and several different machines each of which may utilize several special heads for completing a particular part.

It is a general object of the invention to provide a new and improved method of machining which makes use of inexpensive work holding fixtures of less precision than that required in the finished part, together with adjustable, renewable and reusable low cost fixture inserts which are prepared by the machine which is to work on the part, by machining such inserts with reference to the measuring system of the machine preparatory to mounting the work so that the precision is provided economically by the machine itself.

According to a preferred form of the invention, use is made of a work holding fixture in the form of one or more blocks, which are described herein as modular blocks, of similar or different sizes and shapes, adapted to be mounted on the work supporting table of a milling machine or the like and also adapted to be attached one to the other.

The sides of the blocks are formed with tapped apertures arranged according to a predetermined pattern for mounting suitable inserts such as headed screws or the like which are adapted to be adjusted and/or machined to provide locating surfaces for properly positioning the work relative to the tool.

Modular blocks of the character described provide inexpensive fixtures of general accuracy and great versatility, while inserts thereon, such as headed screws, for the purpose of locating the work, provide the advantages of being adjustable for initially locating the work for a first operation, being machinable with reference to the measuring system of the machine in which they are mounted to provide precision surfaces in one or more planes for engagement with surfaces on the work to thereby provide a precision fixture in an inexpensive manner. Such screws may readily be reused simply by another machining operation, and are easily renewable by removal and replacement.

In lieu of headed screws as described in the preceding paragraph, it may be desirable to use some other form of renewable insert such as bar stock or cold rolled sheet material, particularly where it may be necessary to provide locating surfaces for the work in cradle form rather than merely providing planar surfaces on the head of a screw. It will be understood that such bar stock or sheet material may also be readily attached to a modular block, machined thereon, re-machined for reuse, and removed for replacement by either similar stock or headed screws.

In special situations where a predetermined pattern of tapped apertures in a modular block may not provide suitable positions for locating the headed screws which are to provide locating surfaces for the work, a suitable mounting for such screws or other inserts may be provided by the use of a plate of cold rolled stock suitably attached to a modular block and then provided at specified locations with threaded apertures for receiving headed screws.

In special circumstances where available modular blocks, either singly or in combination, can not readily be arranged to provide an acceptable work holding fixture a special weldment may be utilized. This may be made up of readily available stock to provide almost any irregular shape of only general accuracy and including in one or more planes a plate which may be prepared in the manner specified in the preceding paragraph. In the case of the weldment, the base structure satisfies the functions normally provided by the modular block.

It should be understood that modular blocks of the character mentioned may be provided in a variety of sizes and shapes and kept on hand for use in the most commonly occurring situations. In the cases where a single modular block does not suffice a plurality of blocks may be used, these being mounted on the work supporting table of the machine either separately or built one upon another. This provides great versatility in a very economical manner since the blocks may be manufactured without the need of conforming to a high degree of precision.

The method of this invention provides substantial savings in reducing the number of fixtures required and the cost of fixtures required for producing a given part and has its greatest advantage where complex parts are to be produced in relatively small numbers which either cannot justify the great expense of conventional fixtures or where the cost of conventional fixtures so greatly burdens the ultimate cost of the part that it becomes unreasonable. Even where the parts are to be produced in relatively large numbers such that when the cost of the fixtures is averaged out it may comprise only a small percentage of the part cost, savings can be realized with the method of this invention by greatly reducing fixture costs, by thousands of dollars.

Where the method of this invention is important in reducing the costs of fixtures, additional savings of a substantial nature can be realized by practicing the method in connection with an extremely versatile machine, such as for example, a milling machine of the type described in the copending application of Fred R. Swanson and Carl F. Erikson, filed February 13, 1958, as Serial Number 715,109, now Patent Number 3,083,617, and assinged to the assignee of this application. The machine referred to is constructed to provide extreme versatility in the use of tools in a manner to greatly reduce the number of setups required for bringing the work and the tools together. More particularly, the machine includes a universally adjustable tool head carrying at diametrically opposite axially aligned positions a pair of tool spindles operated at different speeds, such tool head being mounted for universal adjustment to almost any angular position relative to the five exposed sides of a three dimensional piece of work supported on the work table. Complete machining of the part may be accomplished in such a machine where previously several machines may have been required, each utilizing a number of separate special heads. The provision of universally adjustable tools in a versatile machine of the type described, may be characterized as "bringing the tool to the work," where the use of several less versatile machines may be described as "bringing the work to the machine."

Where the method of this invention is practiced in connection with a versatile machine of the type mentioned, the two reduce the costs involved in fixtures and machine setups to a fraction of the costs normally expected to be incurred where conventional precision fixtures and less versatile machines are employed. For example, using conventional fixtures and machines, the tooling costs for processing a part such as that illustrated in FIGS. 5, 6, 7, 8 and 10 usually approaches $15,000. If a versatile machine of the type described is used and the improved method of this invention employed, tooling costs may be reduced to less than $100, only a fraction (less than 1%) of the cost conventionally expected.

Other objects and advantages will become readily apparent from the following detailed description taken in connection with the accompanying drawings, in which.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

Figure 1:
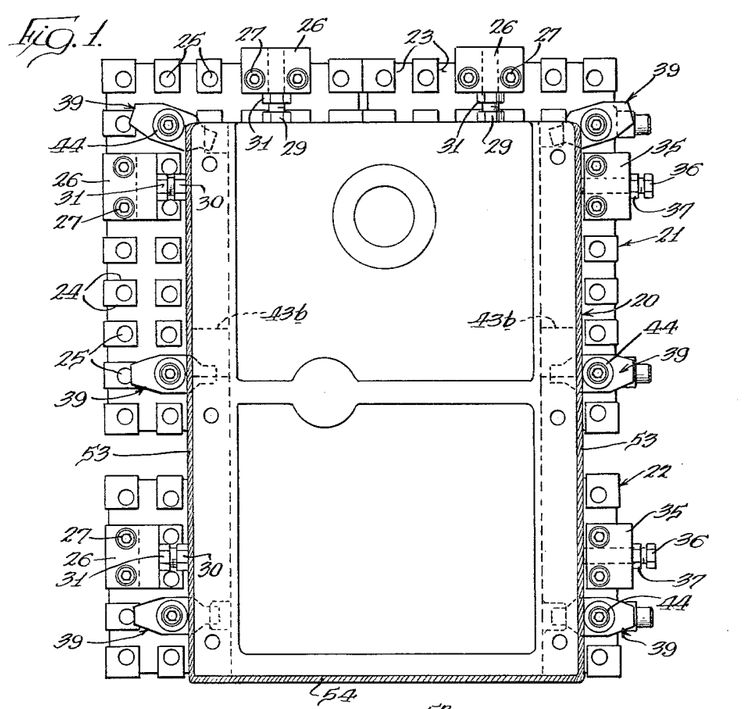
FIG. 1 is a plan view of a workpiece mounted on adjustable inserts in the form of headed screws in modular blocks of the character mentioned.
Figure 2:
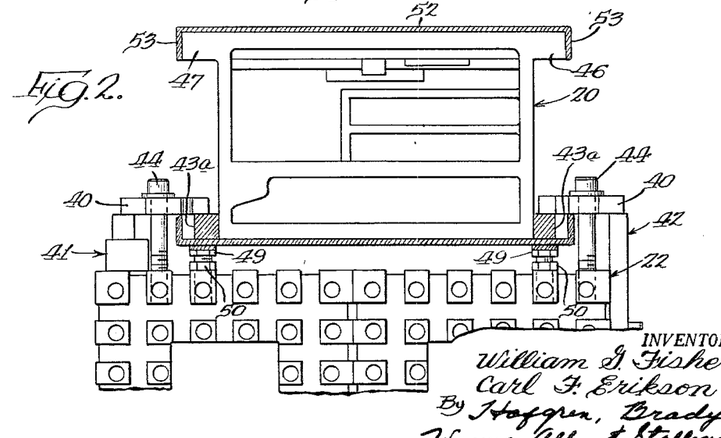
FIG. 2 is a front end elevation of the showing in FIG. 1, FIGS. 1 and 2 illustrating the work mounted for a first operation.

Referring now to the drawings in more detail, a preferred embodiment of the method is illustrated in FIGS. 1 and 2 wherein a workpiece such as that illustrated at 20 is supported in a low cost fixture of only general accuracy or low precision less than the precision required in the finished part when machining is complete. As illustrated, the fixture is comprised of a pair of right angular work supporting blocks 21 and 22 described herein as modular blocks. As illustrated, the blocks are of different sizes, the block 21 being substantially larger than the block 22. In actual construction, the block 21 is 12″ by 14″ by 18″, while the block 22 is 10″ by 12″ by 14″. Each of the blocks illustrated in FIGS. 1–4 is formed on each of its six outer side surfaces with a plurality of grooves arranged in a predetermined pattern which includes parallel grooves 23 extending in one direction and crossing parallel grooves 24 extending in a perpendicular direction. Such grooves are adapted to receive rectangularly shaped keys or the like for suitably positioning and affixing the blocks to the work supporting table in a machine tool such as a versatile milling machine for performing a plurality of different operations, such as milling, drilling, boring, tapping and the like. Additionally, the grooves provided as at 23 and 24 may be utilized for accepting keys or the like for cooperation with suitable keyways provided on the workpiece in special situations.

In addition to the grooves provided in each of the exterior side surfaces of the blocks 21 and 22, each of such surfaces also includes a plurality of threaded apertures as illustrated at 25, arranged in a predetermined pattern to accommodate clamping means for affixing a workpiece to the blocks. As illustrated in FIGS. 1–4, the apertures are provided in the exterior surfaces between the intersecting grooves 23 and 24.

The blocks 21 and 22 are adapted to suitably be secured to a machine tool work supporting table in a manner similar to that illustrated in FIG. 6, described hereinafter.

In order to provide work supporting and locating surfaces on the work supporting blocks 21 and 22, smaller blocks may be attached to the modular blocks as illustrated at 26 as by means of screws 27 passing through the blocks 26 and into the threaded apertures 25. The blocks 26 are thereby firmly anchored to the modular blocks and may include threaded apertures for supporting headed screws as at 29 and 30 adjustably threaded in the blocks 26 and adapted to be locked in position as by means of lock nuts 31. The heads of the screws 29 may be adjusted to locate the workpiece in one plane, while the screws 30 may be adjusted to locate the workpiece in another plane. As will appear, such screws need be adjusted to a precision or accuracy only generally conforming to the precision required in the finished workpiece. Such adjustments must, of course, be within a tolerance permitted by the amount of material to be removed. That is to say, the adjustment of the screws 30 must be such that machining will be permitted on one side of the workpiece in the setup illustrated in FIGS. 1 and 2, while leaving enough material on the opposite side to permit machining when the work is inverted as illustrated in FIGS. 3 and 4.

After the work is properly located against the heads of the screws 29 and 30, it may be suitably secured in position as by means of blocks 35, similar to the blocks 26, having clamping screws 36 adapted to engage the work in opposition to the screws 30 and adapted to be locked in clamping position as by lock nuts 37. Additionally, the work may be held down on the modular blocks 21 and 22 by clamping members as illustrated at 39 each having a heel 40 (FIG. 2) adapted to be suitably supported on the modular blocks as by means 41 and 42. The clamping members are adapted to engage pads provided on the workpiece as at 43a and 43b and may be clamped in position as by screws 44 threaded in the apertures 25 provided on the modular blocks.

Figure 3:
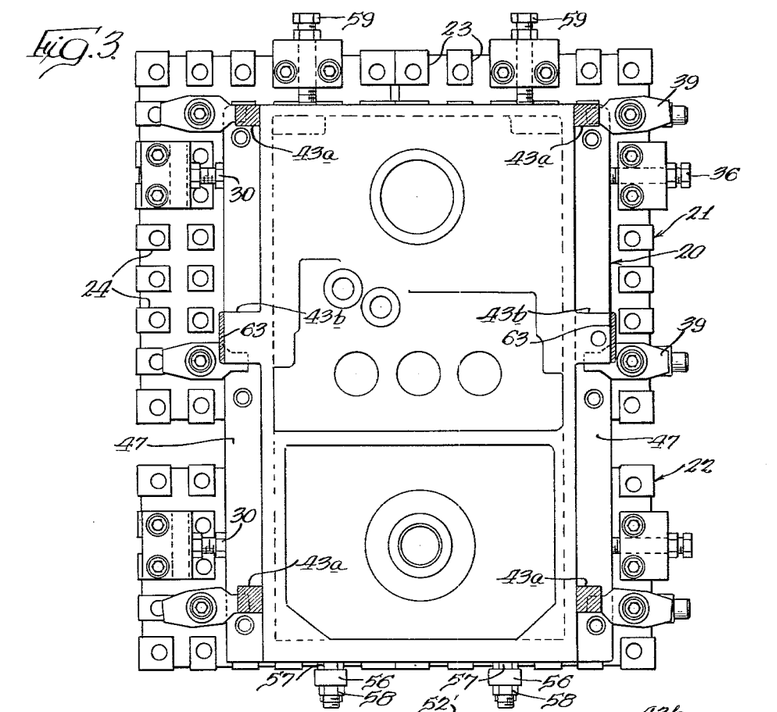
FIG. 3 is a plan view of the workpiece shown in FIGS. 1 and 2, inverted and mounted upon locating surfaces of machined inserts in the form of adjustable screws for a second operation.
Figure 4:
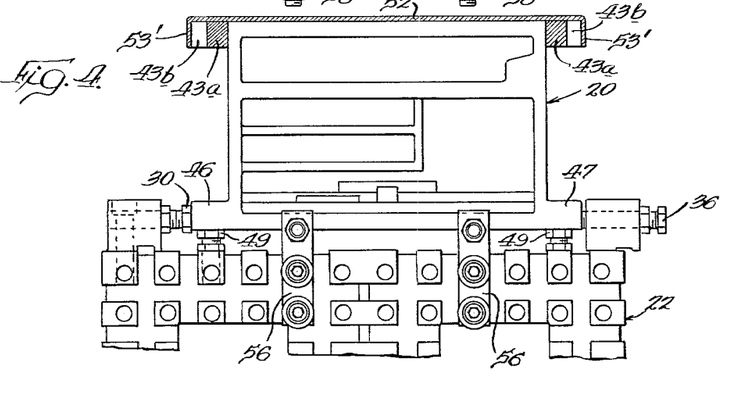
FIG. 4 is a front end elevational view of the setup illustrated in FIG. 3.

The pads 43a are provided on the workpiece especially to facilitate clamping the work and are milled off during the second operation on the work as illustrated in FIGS. 3 and 4. The pads 43b are a part of the workpiece and remain thereon after the milling operations are completed. When the work is inverted from the position illustrated in FIGS. 1 and 2 to the position illustrated in FIGS. 3 and 4, flanges 46 and 47 are engaged by the clamp members 39 for holding the work on the work supporting blocks.

In order to suitably level the workpiece on the work supporting blocks 21 and 22, headed screws are utilized as at 49, suitably threaded in apertures 25 in the blocks and locked in adjusted position as by lock nuts 50. The adjustment of the screws 49 is made in a manner similar to the adjustment of screws 29 and 30 as described above.

In FIGS. 1 and 2, the workpiece is illustrated as it appears prior to the machining operations which are to be performed thereon, that is, it is illustrated with the material to be removed, the latter being indicated by the shaded areas around the margins of the work. More particularly, as the work is set up in FIGS. 1 and 2, it is positioned to have material removed from the upper surface thereof as illustrated at 52 in FIG. 2, and from the side edges as illustrated at 53 in FIGS. 1 and 2 and 54 in FIG. 1.

When the work is suitably located and secured in place as illustrated in FIGS. 1 and 2, it is machined to remove the material illustrated at 52, 53 and 54, leaving precision surfaces in these areas as each surface may be machined relative to reference positions in the machine under control of the measuring system in the machine tool utilized. After the first operation is complete, any one of the surfaces just machined may be considered a precision surface and may be utilized to locate the work precisely for machining opposing precision surfaces having precise relationships to those first machined by virtue of the accuracy of the measuring system of the machine.

The material illustrated at 52, 53 and 54 in FIGS. 1 and 2 is not shown in FIGS. 3 and 4, such material having been removed, the workpiece inverted and the previously machined surfaces utilized for precisely locating the workpiece for a second operation.

Before placing the workpiece in the fixture for the second operation, precision locating surfaces are provided in the fixture by milling the heads of the screws 30 to provide planar surfaces having a predetermined relationship to a reference position in the machine. After such surfaces are machined, they are engaged by a precision surface on the workpiece provided by removal of the material as at 53. In similar fashion, the bottom supporting screws 49 are machined and provide precision surfaces for engagement by the surface on the workpiece left after removal of the material at 52. In order to locate the work properly in a third direction, bars are attached to the block 22 as at 56, and such bars provide mounts for headed screws as at 57, locked in position as by lock nuts 58 and also adapted to be precision machined for engagement by the machined surface on the workpiece left after removal of the material 54.

The work is clamped upon the supporting screws 49 as before by means of clamps such as those shown at 39. The work is clamped against the screws 30 as in the previous setup, by means of screws 36. The work may be clamped against the machined screws 57 as by clamping screws 59 mounted in a fashion similar to that described for the screws 36.

With the work positioned as illustrated in FIGS. 3 and 4, the surface which is now uppermost may be machined to remove the material as illustrated at 52′, the side edges of the pads 43b may be machined to remove the material illustrated at 53′, and the pads 43a which were provided solely for clamping may be machined off.

In lieu of separate screws providing machined locating surfaces as at 30, 49 and 57 (FIG. 3), in some situations it may be desirable to provide a shouldered locating surface including machined surfaces in two or more planes at right angles to each other as shown in connection with the locating screw 50a (FIGS. 11 and 11a) adjustably mounted in a modular block as at 51a and locked in position as by lock nut 52a. The head 53a of such a screw, before machining, may be adjustably positioned for use as a preliminary locating surface, and it may be machined to provide precision surfaces as at 54a, 55a and 56a at right angles to each other and adapted for engagement by machined surfaces at right angles to each other on a lug 57a of a workpiece such as that illustrated in part at 58a.

Figures 11, 11A:
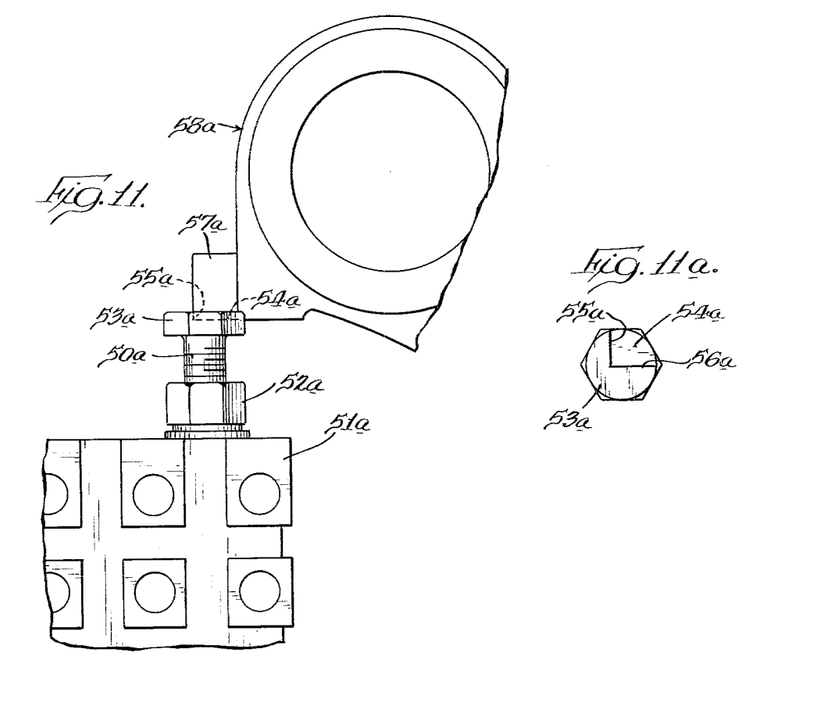
FIG. 11 is a fragmentary elevational view illustrating another workpiece supported on the head of a screw insert machined to provide work locating surfaces in planes at right angles to each other.
FIG. 11a is a top plan view of the machined screw head illustrated in FIG. 11.

In a complete setup of the work as illustrated in FIG. 11 it will be understood that other adjustable screws such as that shown at 50a may have merely a planar surface precision ground in a single plane normal to the axis of the screw for providing a supporting and locating surface for other portions of the work. It will be understood that in addition to such locating surfaces as those which have been described, there may be provided suitable clamping means such as that illustrated at 39 in FIGS. 1–4 for holding the work down upon surfaces as at 54a, together with clamping means such as the adjustable screws illustrated at 36 for holding the work against locating surfaces such as that shown at 55a and 56a.

In situations where one or more available modular blocks do not include threaded apertures in suitable positions for mounting adjustable or renewable inserts in the form of headed screws which will be conveniently located to engage cooperating surfaces on the work, the work may be supported on a low cost fixture in the form of a weldment (not shown) in boxlike form or of other irregular configuration made up of plates from cold rolled stock suitably welded together to provide supports for adjustable or renewable inserts. A weldment of the character described may be utilized in place of one or more modular blocks and may be provided with threaded apertures at suitable positions for receiving headed screws for engaging the work and may include suitable means for mounting clamping devices.

In lieu of such a weldment, in FIGS. 5–10 a modular block is utilized as illustrated at 60, and to the top of such block there is attached a plate 61 of readily available cold rolled stock material which in itself need not be a high precision piece.

The block 60 is of hollow form and includes suitable apertures therethrough as at 62 for receiving elongate bolts 64 having T-shaped heads 65 slidable in complementary slots as at 66 in a work supporting table 67 in a machine tool. The bolts are held in place as by nuts 69 in order to affix the modular block 60 to the work supporting table for movement therewith and against movement relative thereto.

On the outside, the block 60 is provided with a predetermined pattern of slots or grooves as illustrated at 70, and one or more of these may be utilized for keying or locating the block relative to the work supporting table 67 as by means of a key illustrated at 71. Also, the outside of the block is formed with a predetermined pattern of threaded apertures as illustrated at 72, and these may be utilized for receiving bolts or screws as illustrated at 74 for securing the plate 61 to the upper surface of the block 60 with plate edges engaging locaters as at 75 attached to sides of the block.

Figure 7:
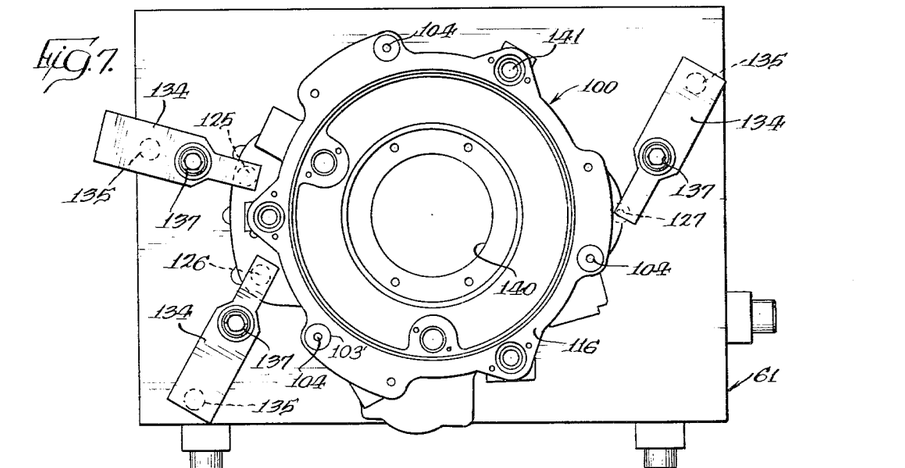
FIG. 7 is a plan view of the work shown in FIGS. 5 and 6, inverted for another operation.
Figure 8:
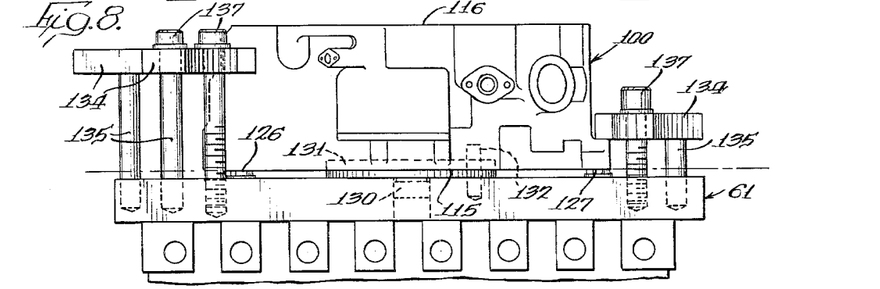
FIG. 8 is a front elevational view of the setup illustrated in FIG. 7.
Figure 9:
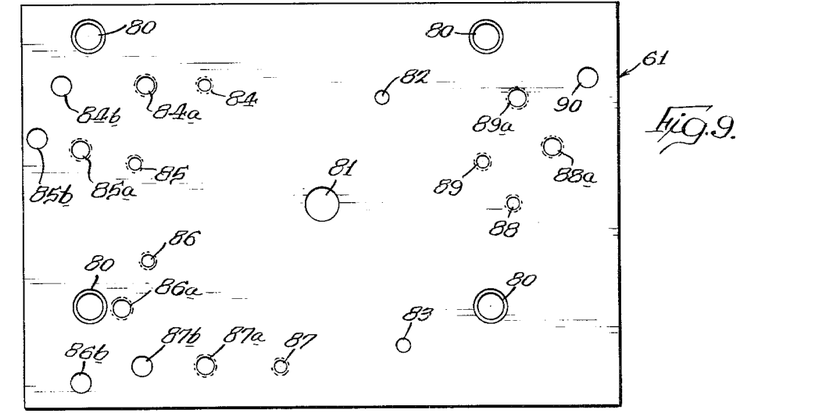
FIG. 9 is a plan view of the plate used in the setup of FIGS. 5–8, illustrating apertures provided in the plate at predetermined locations.

Referring now to FIG. 9, the plate 61 is illustrated as prepared for use in supporting the work as illustrated in the three setups shown respectively in FIGS. 5 and 6, FIGS. 7 and 8 and FIG. 10. The plate includes four counterbored apertures as at 80 for receiving screws 74 for attaching the plate to a modular block. Centrally of the plate, there is provided an aperture 81 adapted to receive a locater for use in connection with the setup illustrated in FIGS. 7 and 8, as described presently. To the right of the aperture 81, as illustrated in FIG. 9, the plate 61 is provided with apertures 82 and 83 adapted for receiving locating pins for orienting the work. The aperture 82 may be utilized in connection with the setup illustrated in FIGS. 7 and 8, and the aperture 83 may be utilized in a subsequent operation illustrated in FIG. 10.

Additionally, the plate 61 is provided with six threaded apertures as at 84, 85, 86, 87, 88 and 89 for receiving adjustable and renewable inserts in the form of headed screws which provide supporting surfaces for the work. In connection with the threaded aperture 84, there is provided another threaded aperture 84a and a bore as at 84b, the latter being provided to receive a pin to act as a heel for a clamping strap and the former being provided to receive a clamping screw for tightening a clamping strap against a heel positioned in the opening 84b and against a portion of a workpiece resting on an insert in the aperture 84. In similar fashion, apertures 85a and 85b are provided in association with the aperture 85, apertures 86a and 86b are provided with the aperture 86, and apertures 87a and 87b are associated with the aperture 87. In association with the apertures 88 and 89, are threaded apertures 88a and 89a respectively, and a single heel aperture 90 is provided.

Figure 5:
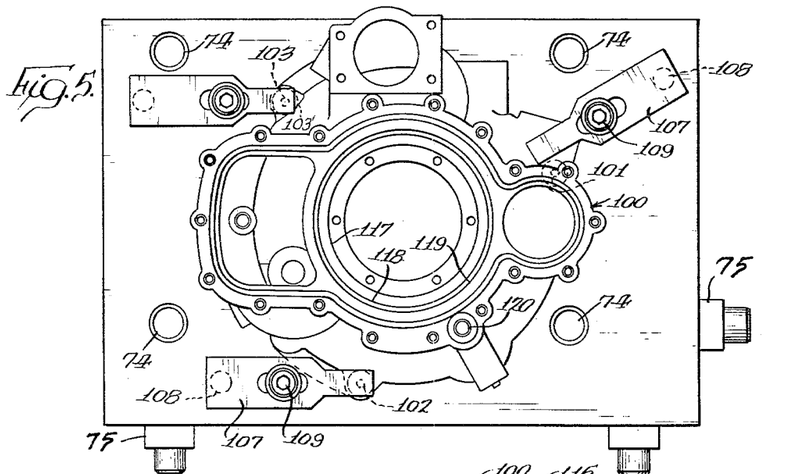
FIG. 5 is a plan view of a complex part mounted upon screw inserts in a plate added to the top of a modular block.
Figure 6:
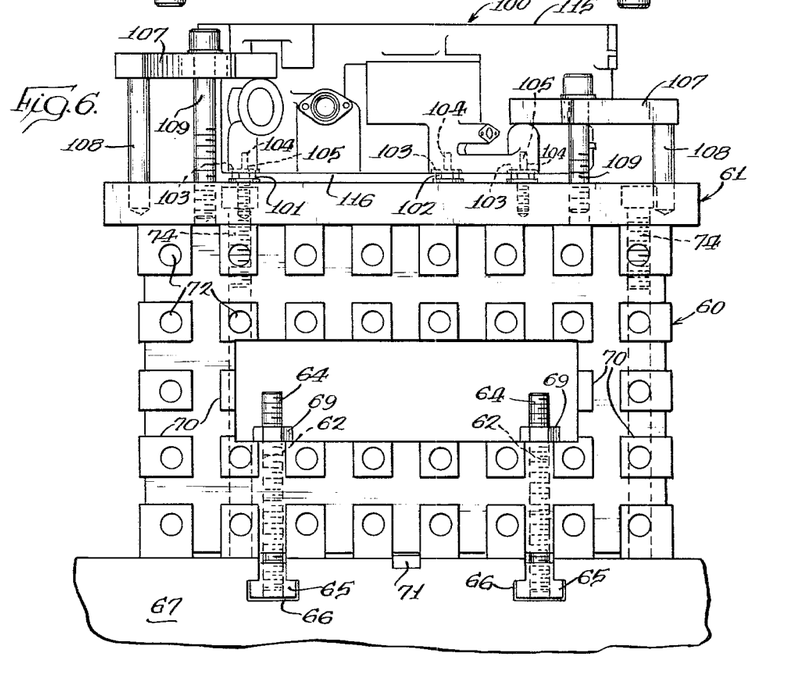
FIG. 6 is a rear elevational view of the setup illustrated in FIG. 5.
Figure 10:
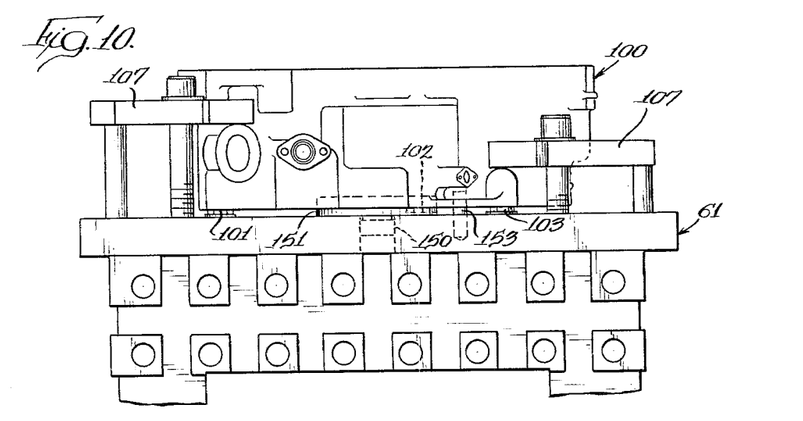
FIG. 10 is an elevational view of the work illustrated in FIGS. 7 and 8, inverted and again positioned as in FIGS. 5 and 6, for a third operation.

FIGS. 5 and 6 illustrate a workpiece 100 to be made into a gear housing. The original workpiece in the form of a casting is adapted to have a plurality of machine operations performed thereon in a plurality of setups in a milling machine or the like. FIGS. 5 and 6 illustrate the work setup for a first group of operations; FIGS. 7 and 8 illustrate the work inverted for a second set of operations; and FIG. 10 illustrates the work inverted from the position of FIGS. 7 and 8 for a third set of operations.

In FIGS. 5 and 6 the work is supported on renewable inserts in the plate 61 in the form of headed screws shown at 101, 102 and 103 positioned respectively in the threaded apertures 84, 87 and 89. At the foundry, the casting 100 is provided with machined recesses in its bottom surface as at 103' adapted to receive the heads of the screws 101, 102 and 103. Additionally, at the foundry, recesses are machined centrally of the recesses 103', as at 104 (see also FIG. 7) for use as targets to receive pins as at 105 positioned in the heads of the screws 101, 102 and 103 for the purpose of locating the workpiece properly relative to the center of the plate 61, as represented by the central aperture 81 therein. The aperture 81 is positioned in the machine at the center line of the work table which is commonly used as a reference point from which measurements are made by the measuring system of the milling machine.

The work 100 is held on the screws 101, 102 and 103 by means of clamping straps as illustrated at 107, each having a heel portion resting upon a dowel pin as at 108 positioned respectively in the apertures 84b, 87b and 90 in the plate 61. The clamp straps are held against the dowel pins 108 and against the work at positions closely adjacent to the screws 101, 102, 103 respectively by means of clamping screws as at 109 threaded respectively in apertures 84a, 87a and 89a in the plate 61.

When the work is positioned as illustrated in FIGS. 5 and 6, the uppermost surface as at 115 may be described as the top of the gear housing, while the lower surface as at 116 may be described as the bottom of the housing. When the work is positioned in the setup of FIGS. 5 and 6, all machining operations on the top surface 115 are completed. Additionally, in the first setup a counterbore 117 is roughed in, a counterbore 118 is roughed in, and a counterbore 119 is roughed in. Each of the three bores mentioned are finish bored in the third operation described hereinafter in connection with FIG. 10.

In addition to the operations mentioned in the preceding paragraph, while the workpiece is set up as illustrated in FIGS. 5 and 6 a bore is formed as at 120, and finished, to be used as a target for use in locating the work for the second operation.

After completion of the operations described in connection with FIGS. 5 and 6, the workpiece is released from the plate 61 and inverted by an angular turnover motion 180° in a front-to-rear direction as the work is viewed in FIG. 5. The work is then located as illustrated in FIGS. 7 and 8, resting upon renewable inserts in the plate 61 in the form of screws as at 125, 126 and 127 without pins as at 105, located in the threaded apertures 85, 86, and 88 respectively in the plate 61. The screws 125, 126 and 127 have their upper surfaces machined off to provide precision locating surfaces having predetermined relationships to the reference system of the machine for cooperation with the precision finished upper surface 115 of the workpiece 100. In this setup, the work is located in one plane by means of the cooperating surfaces at 115 on the work and on the tops of the screws 125, 126 and 127. The work is located properly on the plate 61 with reference to the center thereof as at 81 by means of an insert as illustrated in FIG. 8 including a reduced portion 130 receivable in the aperture 81 in the plate 61, and an enlarged portion 131 receivable in the counterbore 118 machined in the first operation. The work is properly located angularly about the central locating member 130, 131 by means of a target pin 132 (FIG. 8) positioned in the aperture 82 in the plate 61 and receivable in the bore 120 formed in the work in the first operation.

With the work located as described above, the part is held securely in place by means of clamping straps 134 each having heel portions engaging a dowel pin 135 positioned respectively in the apertures 85b, 86b and 90 in the plate 61. Such clamping straps are held against the dowel pins 135 and the workpiece by means of clamping screws illustrated at 137 threaded respectively in the apertures 85a, 86a and 88a in the plate 61.

With the work positioned and clamped as described, the bottom surface 116 of the work is rough and finish machined, the bore 140 is rough and finish machined and a bore as at 141 is finished for use as a target for angularly locating the work during the third operation. In addition all of the work to be formed on the periphery of the workpiece 100 is completed in the second set of operations while the work is positioned as shown in FIGS. 7 and 8.

After the machining operations are complete with the work positioned as shown in FIGS. 7 and 8, the clamping straps 134 are released and the work again inverted to rest upon the screws 101, 102 and 103 which now are machined to provide precision locating surfaces for cooperation with the precison surfaces machined on the bottom of the work as at 116. This mounting of the work is illustrated in FIG. 10. In order to properly locate the work relative to the center of the plate 61, the part shown at 130, 131 in FIG. 8 is removed and a somewhat similar part inserted including a reduced portion 150 positioned in the aperture 81 in the plate 61, and an upper enlarged portion 151 positioned in the bore 140 provided during the second operation. In order to properly locate the work angularly relatively to the part 150, 151 a pin 153 inserted in the aperture 83 in the plate 61 is received in the bore 141 (FIG. 7) provided in the work during the second setup. After the work is properly located and positioned as described, in FIG. 10, it is again clamped to the plate 61 as illustrated in FIGS. 5 and 6 by means of clamping straps 107 etc.

When the work is positioned as illustrated in FIG. 10 for the third set of operations, the bores 117, 118 and 119, which were roughed in the first operation, are now finish machined.

An important advantage of the method of machining as described hereinabove lies in the repetitive accuracy provided by the work supporting setups or pallets in the form of modular blocks or modular blocks with plates as at 61, together with machined work locating surfaces thereon as provided by work locating members described above. More particularly, two or more such setups can be provided in order to have one for use in machining at a particular time, and one or more similar setups which may be loaded with work in preparation for machining, in order to reduce time lost in loading. The machined work locating surfaces of inserts on the modular blocks are repetitively located accurately in the machine by virtue of the locating keys as at 71 (FIG. 6) together with locating keys at right angles to the key 71.

Figure 12:
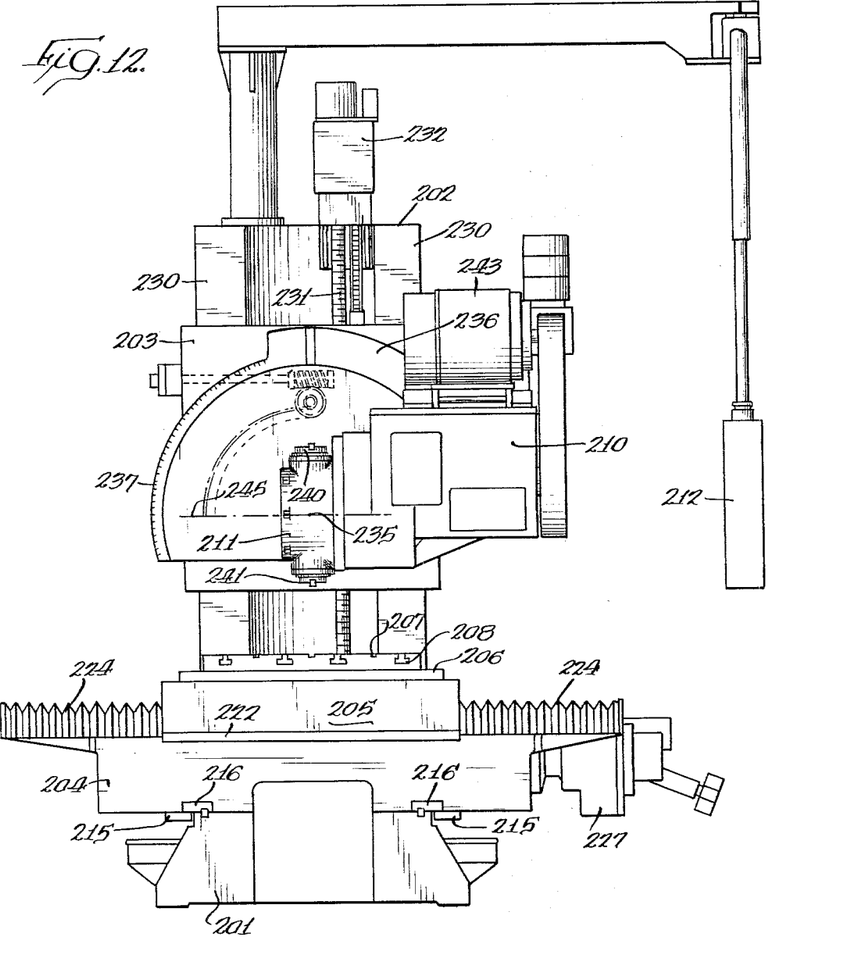
FIG. 12 is a front elevational view of a versatile milling machine having a universally adjustable tool head and a rotary work supporting table by means of which the method of this invention may be practiced.
Figure 13:
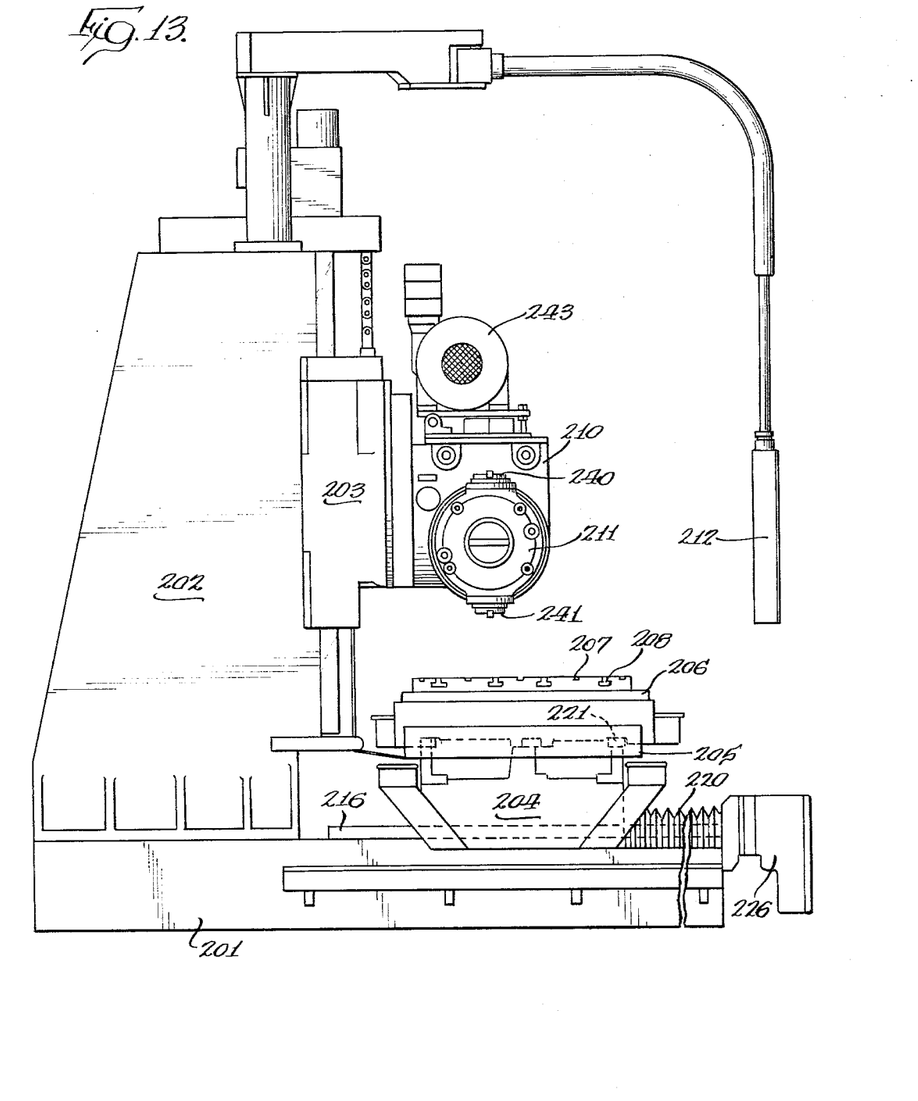
FIG. 13 is a side elevational view, taken from the left of the machine as illustrated in FIG. 12.

The method of this invention as described hereinabove, utilizing inexpensive fixtures prepared with precision locating surfaces in the machine which is to perform the work on a particular part, provides substantial savings in comparison with the use of conventional precision fixtures manufactured separately at great time and expense and attached to the work and to the work support at substantial expense in skilled labor. Additional economies are realized by practicing the method in question with a versatile machine of the type adapted to perform a number of different work operations on a plurality of work surfaces and at any desired angle relative to such work surfaces, such as a machine of the nature disclosed in the copending application of Fred R. Swanson and Carl F. Erikson, filed February 13, 1958, as Serial No. 715,109, now Patent Number 3,083,617. A machine of this general type is illustrated in FIGS. 12 and 13.

Referring to the last mentioned figures, the machine comprises an elongate bed 201 formed to rest on a supporting surface, a column 202 upstanding from the bed at one end thereof, and a main slide 203 movably mounted on the column for up and down movement relative to the bed. The milling machine also includes a cross slide 204 movable on the bed toward and away from the column and carrying a saddle structure 205 for movement transversely of the cross slide 204. The saddle structure 205 carries a work supporting table 206 rotatable about an upright axis and provided with a predetermined pattern of key slots as at 207 intersecting at right angles to each other and a predetermined arrangement of T slots 208 intermediate key slots 207. The slots 207 are adapted to receive suitable keys for locating and affixing the work or work supporting fixture to the rotary table 206, while the slots 208 are adapted to receive T-headed bolts for securing the work or work fixture on the table.

The main slide 203 adjustably carries a transmission head 210, and a spindle head 211 and is adjustably carried on the transmission head. A control box 212 for the movable components of the machine is supported on a pendant 213.

The bed 201 and the column 202 are connected together to form a relatively massive structure with the bed being relatively short in height so that a workpiece supported on the table 206 is readily visible to an operator standing adjacent thereto and manipulating the control box 212. Cross slide 204 and the bed 201 are formed with coacting ways indicated generally at 215 and 216 which slidably support the cross slide in its movement toward and away from the column 202. Preferably, the portion of the ways 216 which extend forwardly of the machine in front of the worktable are enclosed in a bellows housing 220 which prevents collection of foreign matter which would cause damage to the ways and hinder the proper movement of the cross slide.

The cross slide 204 and the saddle 205 are provided with coacting ways indicated generally at 221 and 222 which slidably support the saddle structure including the table for movement in a direction transverse to the movement of the cross slide. Preferably, the ways 221 are enclosed in bellows housing as at 224 at opposite sides of the saddle structure 205 in order to prevent collection of foreign matter on the ways.

The cross slide is connected for movement on the bed by drive means including a motor as at 226 controllable from the box 212 while the saddle structure is adapted for movement on the cross slide by drive means including a motor as at 227 also controllable from the box 212. It will be understood that both the cross slide and the saddle structure may be moved at one time in order to provide a resultant movement of the work at angles to the movement of the cross slide and the saddle structure.

The column 202 has ways 230 on which the main slide 203 is mounted for vertical movement by means including a drive screw 231 and a drive motor 232.

The main slide 203 carries the transmission head 210 for pivotal adjustment about an axis (represented by dot 235) normal to the front of the column 202. To this end, the transmission head has a base 236 movable on an arcuate way 237 on the main slide 203 curved about the pivot axis 235 of the transmission head. Suitable means (not illustrated in detail herein) may be included in the machine for adjusting the base 236 angularly about the pivot axis 235 to thereby position the base within a 90° range of movement in a counterclockwise direction from the position illustrated in FIG. 12.

The spindle head 211 includes at diametrically opposite upper and lower positions, as illustrated in FIGS. 12 and 13, a pair of spindles 240 and 241 adapted to be driven at different speeds by a common transmission mechanism in the head 210 and in turn driven by suitable drive means including a motor as at 243. In addition to the angular adjustment of the transmission head and the attached spindle head about the pivot axis 235, the spindle head is angularly adjustable about a horizontal axis as illustrated in FIGS. 12 and 13 indicated by the broken line 245 so that either the spindle 241 or the spindle 240 may be positioned adjacent the work supporting table 206. Suitable means not illustrated in detail may be provided for angularly indexing the spindle head and clamping the same in adjusted positions.

It will be appreciated that a machine of the type described including a universally adjustable spindle head and a rotatable work supporting table, provides the utmost in versatility and will facilitate use of a tool in either of the spindles 240 or 241, such as milling, drilling, boring and tapping tools, to work on any of the five exposed sides of a cubic workpiece on the table 206, including the top surface and the four side surfaces, and at the same time the tool may approach any of these surfaces at substantially any angle desired. It will be understood that a machine of this type, in effect, brings the tool to the work rather than requiring that the work be brought to the tool and thereby greatly reduces the number of setups required over conventional practices to bring the tool and the work together for completing complex parts.

Figure 14:
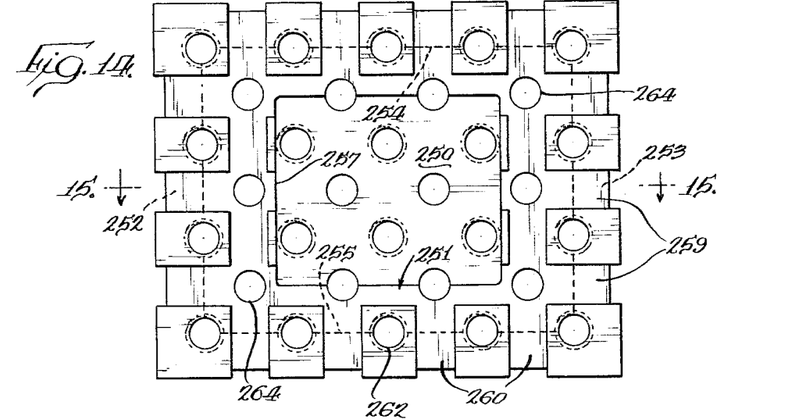
FIG. 14 is an elevational view illustrating one form of modular block.
Figure 15:
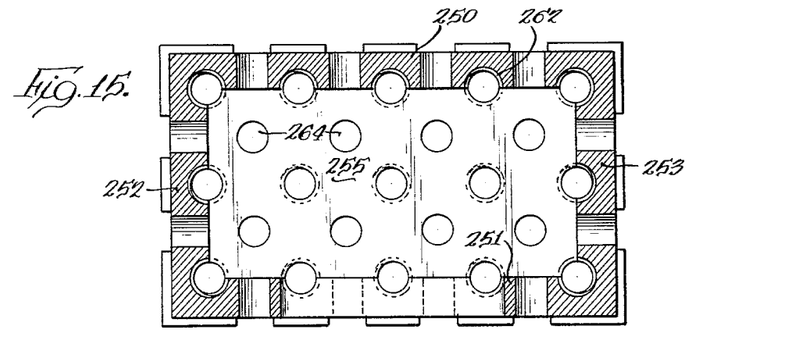
FIG. 15 is a sectional view, taken at about the line 15—15 of FIG. 14.

Preferred forms of the modular blocks previously referred to are illustrated in FIGS. 14–20. In FIGS. 14 and 15, the block is machined, but not to a high degree of precision, from a hollow casting to provide a right angular body in the form of a rectangular parallelepipedal block having opposed walls 250 and 251, opposed walls 252 and 253 and opposed walls 254 and 255, the wall 251 having a rectangular opening therethrough as at 257 providing access to the interior of the block to facilitate attachment of the block to a work supporting table in a machine tool or the like as described presently.

Externally, each of the walls of the block is provided with a predetermined pattern of grooves including parallel grooves as at 259 and parallel grooves as at 260 extending at right angles to the grooves 259 and crossing the latter. The grooves 259 and 260 facilitate the reception of keys therein in order to locate and fix the modular block to the surface of a work supporting table. The grooves 259 and 260 may also be utilized to receive key members in turn keyed to a workpiece or part supported on the block in order to properly locate and affix the work on the block.

In addition to the grooves as at 259 and 260, each of the walls of the block is formed with a predetermined arrangement of threaded apertures therethrough as at 262, these occurring in the block illustrated at positions between the grooves 259 and 260. Such apertures are adapted for the reception of renewable or adjustable inserts in the form of headed screws threaded in the apertures and intended for use as adjustable or machinable locating surfaces for work supported on the block. In addition to use in connection with renewable inserts in the form of headed screws as previously described, the threaded apertures, 262 are also adapted for receiving screws which provide locating stops at the sides of the block and also for supporting threaded screws which may be utilized as clamping screws for holding clamping straps against the modular block and against the workpiece supported thereon. Further, the threaded apertures may be utilized for securing smaller blocks on the modular block illustrated, wherein such blocks may comprise either smaller modular blocks or merely blocks provided with threaded openings for supporting a clamping screw or the like as described in connection with previous figures illustrating workpieces mounted upon blocks such as that in FIGS. 14 and 15.

The walls of the modular block are also provided with a predetermined arrangement of drilled or bored apertures therethrough as at 264, which are not threaded, and which are preferably located in the grooves 259 and 260, and as illustrated, at the intersections of such grooves. The apertures 264 may be utilized for receiving bolts or the like, particularly T-headed bolts adapted for slidably fitting T slots on the upper surface of a work supporting table for the purpose of clamping the modular block to the work supporting table. In such cases, the T head of such a bolt would be positioned in the T slot of the work supporting table, the shank of the bolt passing upwardly through one of the openings 264, and the threaded end of the shank carrying a clamping nut positioned inside the block and adapted to be tightened in place by virtue of the access provided through the opening 257.

Figure 16:
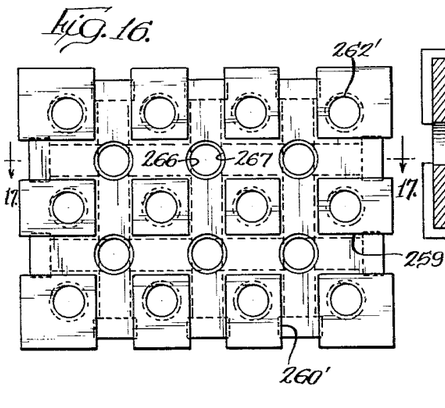
FIG. 16 is an elevational view illustrating another modular block.
Figure 17:
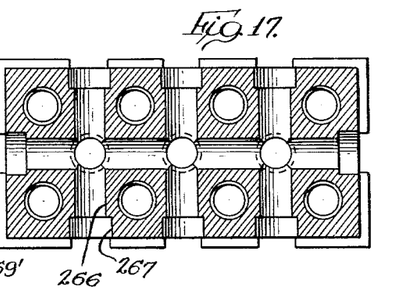
FIG. 17 is a sectional view taken at about the line 17—17 of FIG. 16.

In FIGS. 16 and 17, the modular block is comprised of a solid casting which is machined on the outside, but not to a high degree of precision, the size of the block being such that a hollow interior would not provide an area conveniently usable as in the case of the block illustrated in FIG. 14. The block in FIGS. 16 and 17 is provided on the six outer side surfaces with parallel grooves 259′ corresponding to those illustrated at 259 in FIGS. 14 and 15, and parallel grooves 260′ corresponding to those illustrated at 260 in FIGS. 14 and 15, and also includes on each exterior side surface a predetermined pattern arrangement of threaded apertures 262′ corresponding to those illustrated in 262 in FIGS. 14 and 15. The grooves 259′ and 260′ and the threaded apertures 262′ may be utilized in a fashion similar to that of the grooves 259, 260 and the apertures 262 described in connection with FIGS. 14 and 15.

In order to provide for attachment of the modular block of FIGS. 16 and 17 to the work supporting table in a machine tool, the block is formed with drilled or bored openings completely therethrough as illustrated at 266, and counterbored as at 267. The apertures 266 are adapted to receive bolts as described in connection with the apertures 264 in FIGS. 14 and 15, with the heads or nuts thereof seated in the counterbores 267 for use in attaching the block to the work supporting table in a machine tool.

In actual construction, the block illustrated in FIGS. 14 and 15 is 6″ by 8″ by 10″, while the block illustrated in FIGS. 16 and 17 is 4″ by 6″ by 8″. It will be understood that blocks along the lines of that illustrated in FIGS. 16 and 17 may be made in smaller sizes, while blocks along the lines of that illustrated in FIGS. 14 and 15 may be made to larger sizes. In the remaining FIGURES 18–21, a block of the latter type is illustrated, which in actual construction may be 12″ by 15″ by 18″.

Figure 18:
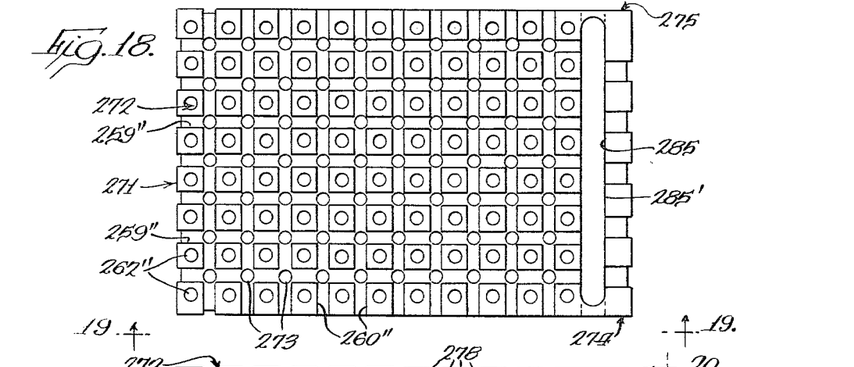
FIG. 18 is an elevational view of another modular block.
Figure 19:
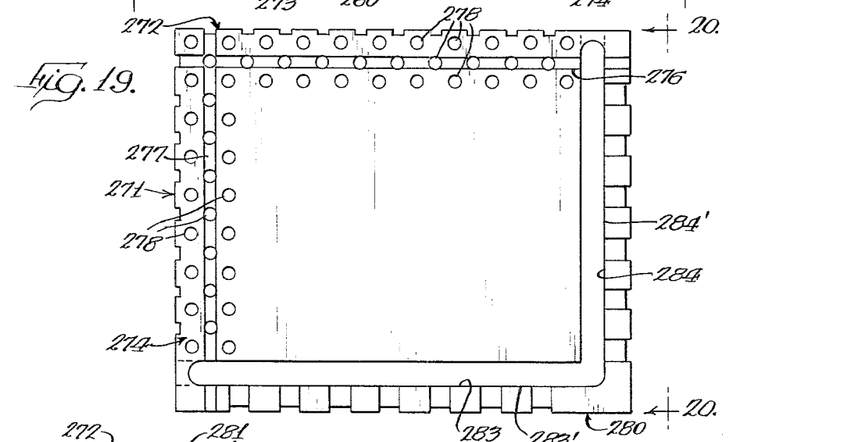
FIG. 19 is an elevational view taken at about the line 19—19 of FIG. 18.
Figure 20:
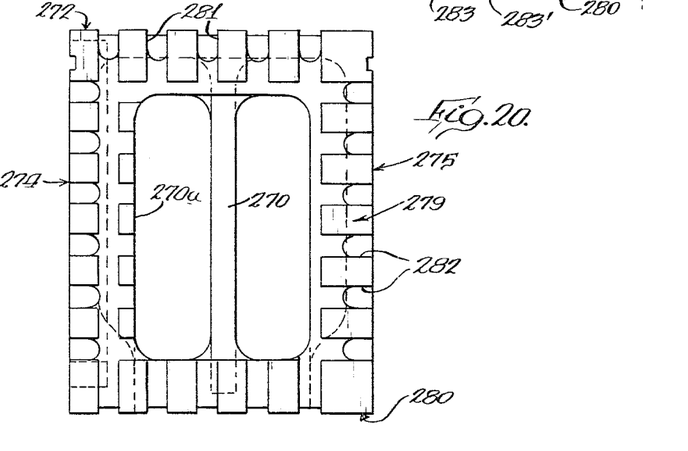
FIG. 20 is an elevational view taken at about the line 20—20 of FIG. 19.

The block of FIGS. 18–20 is similar to that illustrated in FIGS. 14 and 15 in that it is largely hollow, but due to its size includes an interior reinforcement wall as illustrated at 270 visible through an end opening 270a. This block includes two similar outer sides, 271 defining the left hand margin of FIGS. 18 and 19, and 272 visible in FIG. 18, both provided with an arrangement of grooves 259″ and 260″ corresponding to the grooves as at 259 and 260 in FIGS. 14 and 15 and at 259′ and 260′ in FIGS. 16 and 17. The sides 271 and 272 also are formed with an arrangement of threaded apertures as at 262″, occurring between the intersecting grooves 259″ and 260″, and corresponding to comparable threaded apertures provided at 262 in FIGS. 14 and 15 and 262′ in FIGS. 16 and 17.

In this form of the modular block, because the interior of the block is not completely accessible due to the presence of the reinforcing wall 270, and because the use of bolts in apertures as at 264 in FIGS. 14 and 15 and 266 in FIGS. 16 and 17 may not provide sufficient rigidity for holding a block of this size during machining operations, apertures comparable to those at 264 and 266 are not utilized in the block of FIGS. 18–20. Instead, in the places where such apertures had been provided in the blocks previously described, additional threaded apertures are provided as at 273, occurring in the grooves 259″ and 260″, at the intersections of these grooves. The last mentioned group of apertures provide additional versatility for use in selecting positions for mounting adjustable or machinable headed screws for work locating surfaces.

The block of FIGS. 18–20 also includes two similar outer sides 274, visible in FIG. 19, and 275 opposite the side 274. Each of these includes one horizontal groove 276 and one vertical groove 277. Along the grooves 276 and 277, and on opposite sides thereof, are three rows of threaded apertures as at 278. In normal use of this block, work may be mounted on one of the sides 271 and 272, and the sides 274 and 275 may be used for mounting clamping straps engageable with the work as illustrated for example at 39 in FIG. 11 or stop or clamp screws engageable with the work as illustrated, for example, at 29 and 36 in FIG. 1.

The remaining two sides of the block, 279, visible in FIG. 20, and 280, at the bottom of FIG. 20, are formed with relatively large parallel grooves as at 281 and transverse to the grooves 281 parallel grooves 282 which cross the grooves 281. The surfaces 279 and 280 may be utilized selectively on the upper surface of a work supporting table in a milling machine or the like. The grooves 281 and 282 in the side surfaces 279 and 280 are adapted for receiving suitable keys for locating and affixing the modular block to a work supporting table.

In order to clamp the block illustrated in FIGS. 18–20 to the work supporting table with either of the surfaces 281 or 282 engaging the work table, suitable clamping toes are provided on the side surfaces 271, 272, 274 and 275 at the edges of the latter adjacent to the surfaces 279 and 280. Clamping toes as illustrated at 283 and 284 in FIG. 19 are provided on the sides 274 and 275. Clamping toes as at 285 in FIG. 20 are provided on the sides 271 and 272. The clamping toes are provided by grooves machined as at 283′, 284′, and 285′. The latter facilitate the use of clamping straps engageable in the grooves over the clamping toes and suitably anchored on the work supporting table to thereby clamp the block on the table.

We claim:

1. A method of machining, comprising, the steps of, attaching to a machine tool work supporting table a work supporting block of only general accuracy, attaching to the block at predetermined positions thereon a plurality of adjustable headed screws, locking said screws against movement, utilizing the machine tool to machine precision work locating surfaces on certain of the heads of said screws in a plane having a predetermined relationship to a reference position in the machine, utilizing the machine to machine precision work locating surfaces on the heads of other of said screws in planes at right angles to said first mentioned plane and to each other to form corners and having predetermined relationships to said reference position in the machine, positioning a workpiece against said work locating surfaces, and utilizing the machine tool to machine surfaces on the workpiece having predetermined relationships to said work locating surfaces.

2. A method of machining, comprising, the steps of, attaching to a machine tool work supporting table at work supporting fixture of only general accuracy, mounting on the fixture a plurality of headed screws having tops lying in planes at right angles to each other, locking said screws against movement, utilizing the machine tool to machine locating surfaces on the tops of said heads in planes at right angles to each other and having predetermined relationships to reference positions in the machine tool, positioning a workpiece with precision machined surfaces thereon engaging the precision locating surfaces on said screw heads, clamping the workpiece against said surfaces, and utilizing the machine tool to machine precision surfaces on the workpiece having predetermined relationships to the engaged surfaces of said workpiece and said screw heads.

3. A method of machining with a machine tool having a plurality of machining axes of movement, comprising, the steps of, attaching to a machine tool work supporting table a work supporting block of only general accuracy, attaching to the block at predetermined positions thereon a plurality of adjustable headed screws, means for locking said screws against movement, utilizing the machine tool by movement along one of said machining axes to machine precision work locating surfaces on the heads of some of said screws spaced from each other, said surfaces defining a plane parallel to said one machining axis, utilizing the machine tool by movement along an other of said machining axes to machine precision work locating surfaces on the heads of others of said screws which are spaced from each other, said last mentioned surfaces defining a plane parallel to said other machining axis and at an angle to said first mentioned plane, positioning a workpiece against said work locating surfaces, and utilizing the machine tool to machine surfaces on the workpieces having predetermined relationships to said work locating surfaces.

References Cited by the Examiner

UNITED STATES PATENTS

| | | | |
|---|---|---|---|
| 1,254,044 | 1/1918 | Johnson | 90—59 |
| 1,346,504 | 7/1920 | Mathison | 90—59 |
| 1,486,342 | 3/1924 | Hoke | 51—286 |
| 2,572,013 | 10/1951 | Cushman. | |
| 2,651,951 | 9/1953 | Altenburger | 33—174 X |
| 2,707,419 | 5/1955 | Schron | 29—1.7 |
| 2,747,271 | 5/1956 | Raehrs et al. | 29—558 |
| 2,783,050 | 2/1957 | Garrison et al. | 29—1.7 X |
| 2,961,764 | 11/1960 | Frojd | 29—558 |
| 3,104,474 | 9/1963 | Rehart | 82—34 X |

OTHER REFERENCES

Wespo Clamps and Fixture Details, 1961, page 9, Half Turn Screws.

WHITMORE A. WILTZ, *Primary Examiner.*

THOMAS E. BEALL, HYLAND BIZOT, JOHN F. CAMPBELL, *Examiners.*